US006581013B1

(12) United States Patent
Annis et al.

(10) Patent No.: US 6,581,013 B1
(45) **Date of Patent: *Jun. 17, 2003**

(54) METHOD FOR IDENTIFYING COMPOUNDS IN A CHEMICAL MIXTURE

(75) Inventors: D. Allen Annis, Cambridge, MA (US); Mark Birnbaum, New York, NY (US); Seth N. Birnbaum, Boston, MA (US); Andrew N. Tyler, Reading, MA (US)

(73) Assignee: Neogenesis Pharmaceuticals, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,282

(22) Filed: Jul. 31, 2000

Related U.S. Application Data

(63) Continuation-in-part of application No. 09/233,794, filed on Jan. 19, 1999, now Pat. No. 6,147,344.

(60) Provisional application No. 60/104,389, filed on Oct. 15, 1998.

(51) Int. Cl.[7] .................... G01N 31/00

(52) U.S. Cl. .................... 702/27; 702/22; 702/23; 702/31

(58) Field of Search .................... 702/27, 22, 23, 702/25, 28, 31; 250/281, 282, 287, 288

(56) References Cited

U.S. PATENT DOCUMENTS 5,072,115 A * 12/1991 Zhou .................... 250/252.1
5,453,613 A * 9/1995 Gray et al. .................... 250/281

* cited by examiner

*Primary Examiner*—John Barlow
*Assistant Examiner*—Hien Vo
(74) *Attorney, Agent, or Firm*—Fish & Richardson P.C.

(57) ABSTRACT

A technique for automatically analyzing mass spectrographic data from mixtures of chemical compounds has a series of screens designed to eliminate or reduce incorrect peak identifications due to background noise, system resolution, system contamination, multiply charged ions and isotope substitutions. With such a technique, mass spectrograph data analysis may be greatly simplified by the identification of probable spurious signals, and analysis will become simpler and more accurate.

19 Claims, 18 Drawing Sheets

THE THEORETICAL ISOTOPE PATTERN FOR CARBON.

SHOWING THAT TWO SPECIES ONE MASS APART BOTH PRODUCE IONS AT M/Z 414 IN THEIR MOLECULAR SIGNALS.

LC/MS ANALYSIS OF A 5,000 COMPONENT SYNTHETIC LIBRARY

A MASS SPECTRUM IN WHICH M/Z 574 IS A MINOR ION OF INTEREST.

INTENSITY OF THE M/Z 574 PEAK IS 1.78e4 COUNTS

REPRESENTATION OF PEAK DETECTION PARAMETERS

PARAMETERS MAY BE USER DEFINED OR ESTABLISHED BY PRELIMINARY DATA ANALYSIS (AVERAGE NOISE, AUTOMATIC DETECTION OF FILE SIZE (SCAN COUNT), STORED (DEFAULT) VALUES FOR PEAK PARAMETER FIELDS ETC.

ESTABLISH SHIFT PARAMETERS FOR INPUT LIST
(SEARCH MASS LIST)

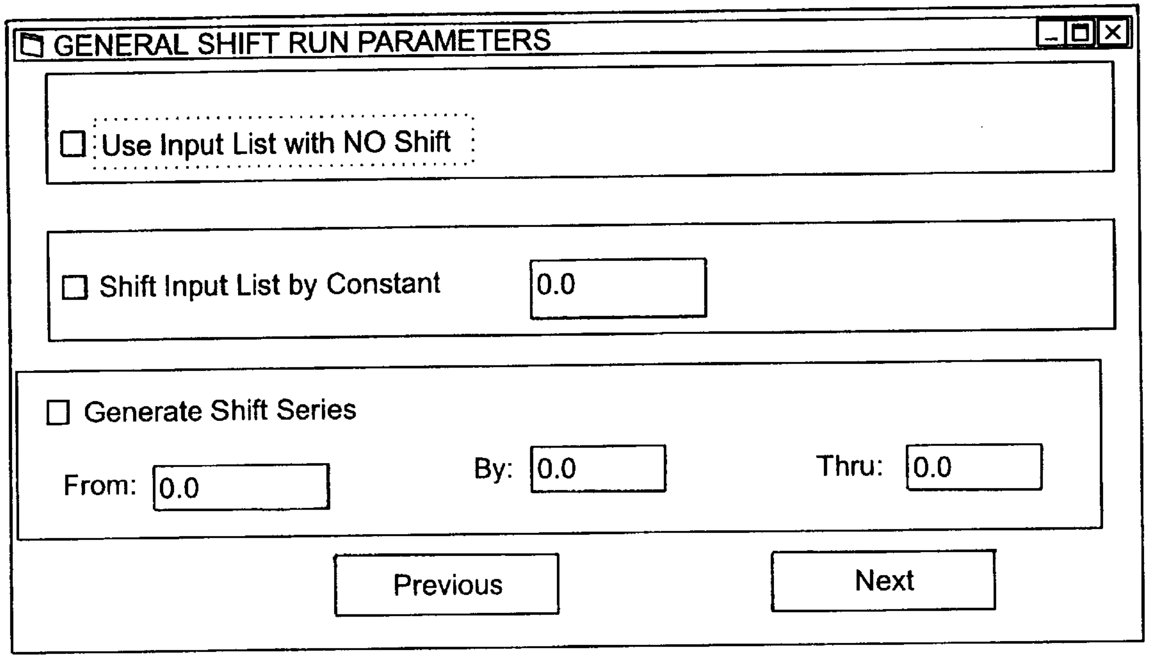

FIG. 12

The data analysis algorithm uses a search mass list to identify chemical entities by their molecular weight and relate that weight to a structure, chemical formula, or a set of chemical moeities comprising a compound in a chemical mixture, in this screen the algorithm can use an automatically generated set of potential masses or shift a loaded set of search masses by an arbitrary amount to seek almost any chemical in a mixture. Once a match is found additional algorithms or a simple look-up table can match the found mass with a compound, structure or molecular formula.

EXAMPLE OF A SEARCH MASS LIST:

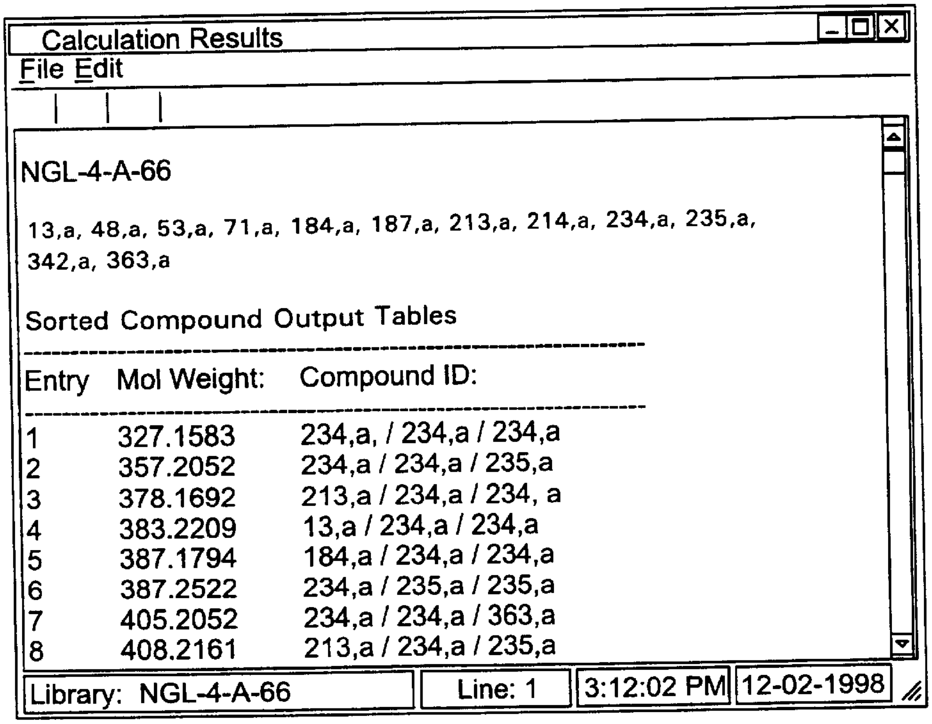

This is an example of a search mass list, generated from a mixture library, the full list has 715 expected masses, when you consider sodium as well as protonated adducts that results in 1430 potential mass matches, the data analysis algorithm and process was developed to rapidly search large Mass Spec data sets for such a high number of masses, existing methodoligies are too slow or inadequate for this type of purpose. In fact, once the number of potential masses to search for exceeds 100 even the most advanced software and mathematical solutions take hours to yield results, and the results still need to be reviewed by hand; a time consuming and almost fruitless process.

FIG. 13

EXAMPLE: OUTPUT FILES, RESULTS OF MULTI-FILE ANALYSIS patent peaks.txt - Notepad File Edit Search Help

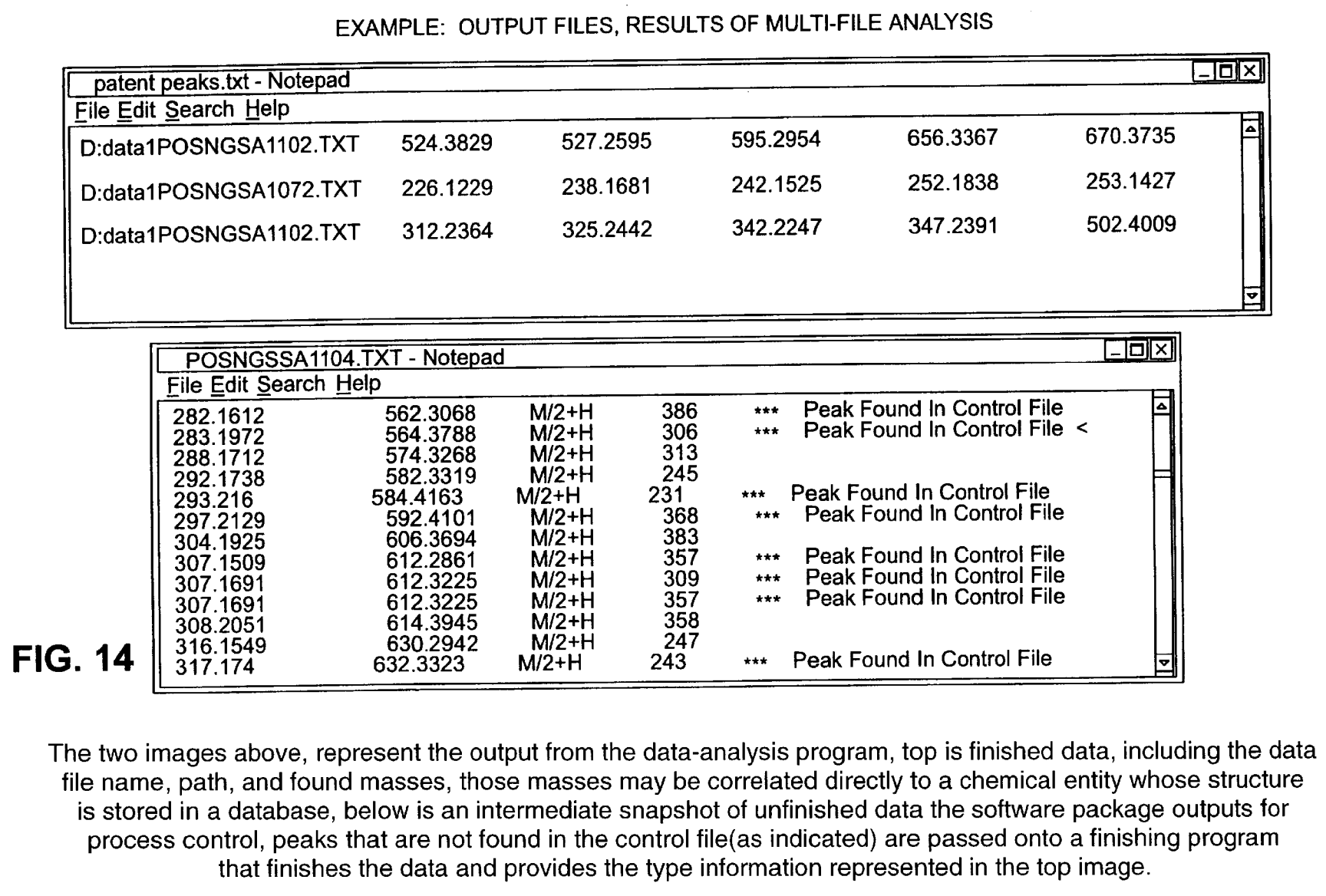

| | | | | | |
|---|---|---|---|---|---|
| D:data1POSNGSA1102.TXT | 524.3829 | 527.2595 | 595.2954 | 656.3367 | 670.3735 |
| D:data1POSNGSA1072.TXT | 226.1229 | 238.1681 | 242.1525 | 252.1838 | 253.1427 |
| D:data1POSNGSA1102.TXT | 312.2364 | 325.2442 | 342.2247 | 347.2391 | 502.4009 |

POSNGSSA1104.TXT - Notepad

File Edit Search Help

| | | | | | |
|---|---|---|---|---|---|
| 282.1612 | 562.3068 | M/2+H | 386 | *** | Peak Found In Control File |
| 283.1972 | 564.3788 | M/2+H | 306 | *** | Peak Found In Control File < |
| 288.1712 | 574.3268 | M/2+H | 313 | | |
| 292.1738 | 582.3319 | M/2+H | 245 | | |
| 293.216 | 584.4163 | M/2+H | 231 | *** | Peak Found In Control File |
| 297.2129 | 592.4101 | M/2+H | 368 | *** | Peak Found In Control File |
| 304.1925 | 606.3694 | M/2+H | 383 | | |
| 307.1509 | 612.2861 | M/2+H | 357 | *** | Peak Found In Control File |
| 307.1691 | 612.3225 | M/2+H | 309 | *** | Peak Found In Control File |
| 307.1691 | 612.3225 | M/2+H | 357 | *** | Peak Found In Control File |
| 308.2051 | 614.3945 | M/2+H | 358 | | |
| 316.1549 | 630.2942 | M/2+H | 247 | | |
| 317.174 | 632.3323 | M/2+H | 243 | *** | Peak Found In Control File |

FIG. 14

The two images above, represent the output from the data-analysis program, top is finished data, including the data file name, path, and found masses, those masses may be correlated directly to a chemical entity whose structure is stored in a database, below is an intermediate snapshot of unfinished data the software package outputs for process control, peaks that are not found in the control file(as indicated) are passed onto a finishing program that finishes the data and provides the type information represented in the top image.

THEORETICAL ISOTOPE PATTERN FOR $C_{90}H_{130}N_{10}O_{20}$

THE (p+1) PEAK INTENSITY EXCEEDS THAT OF THE NORMAL ION.

THEORETICAL ISOTOPE PATTERN FOR TIN.

SHOWING THE THEORETICAL ISOTOPE PATTERNS FOR MOLECULES CONTAINING ONE (UPPER TRACE), TWO (MIDDLE TRACE) AND THREE (LOWERTRACE) BROMINE ATOMS.

METHOD FOR IDENTIFYING COMPOUNDS IN A CHEMICAL MIXTURE

CROSS REFERENCE TO RELATED APPLICATION(S)

This application is a continuation in part of application Ser. No. 09/233,794, filed Jan. 14, 1999 now U.S. Pat. No. 6,147,344; which claims the benefit of U.S. Provisional Application No. 60/104,389 dated Oct. 15, 1998, the entire teachings of which are incorporated herein by reference.

BACKGROUND OF THE INVENTION

This invention relates generally to Mass Spectrographic analysis, and more specifically to the identification of organic compounds in complex mixtures of organic compounds.

Mass spectrometry (MS) is a widely used technique for the identification of molecules, both in organic and inorganic chemistry. MS may be thought of as a weighing machine for molecules. The weight of a molecule is a crucial piece of information in the identification of unknown molecules, or in the identification of a known molecule in a unknown mixture of molecules. Examples of situations in which MS analysis may be used include drug development and manufacture, pollution control analysis, and chemical quality control.

MS is frequently used in conjunction with other analysis tools such as gas chromatography (GC) and liquid chromatography (LC), which help to simplify the analysis of MS spectra by essentially spreading out the timing of the arrival of the individual components of a chemical mixture to the MS system. Thus, the number of different molecular species in the mass spectrometer at any one time is reduced, and separation of mass spectrum peaks is simplified. This procedure works well for chemical samples that contain on the order of 10 to 20 different molecular species, but is inadequate for analyzing samples that contain thousands of different species.

Mass spectrometry operates by first ionizing the chemical material of interest in an ionization source. There are many well known ionization sources in the art, such as electrospray ionization (ESI) and atmospheric pressure chemical ionization (ApCI). The above mentioned ionization methods generally produce what is known in the art as a protonated molecule, meaning the addition of a proton or a hydrogen nucleus, $[M+H]^{+,}$ where M signifies the molecule of interest, and H signifies the hydrogen ion, which is the same as a proton.

Some ionization methods will also produce analogous ions. Analogous ions may arise by the addition of an alkaline metal cation, rather than the proton discussed above. A typical species might be $[M+Na]^+$ or $[M+K]^+$. The analysis of the ionized molecules is similar irrespective of whether one is concerned with a protonated ion as discussed above or dealing with an added alkaline metal cation. The major difference is that the addition of a proton adds one mass unit (typically called one Dalton), for the case of the hydrogen ion (i.e., proton), 23 Daltons in the case of sodium, or 39 Daltons in the case of potassium. These additional weights or masses are simply added to the molecular weight of the molecule of interest and the MS peak occurs at the point for the molecular weight of the molecule of interest plus the weight of the ion that has been added.

These ionization methods can also produce negative ions. The most common molecular signal is the deprotonated molecule $[M-H]^-$, in this case the mass is one Dalton lower than the molecular weight of the molecule of interest. In addition, some ionization methods will produce multiply charged ions. These are of the general identification type of $[M+nH]^{n+}$, where small n identifies the number of additional protons that have been added.

The ions produced in any of the ionization methods discussed above are passed through a mass separator, typically a magnetic field, a quadrupole electromagnet, or a time-of-flight mass separator, so that the mass of the ions may be distinguished, as well as the number of ions at each mass level. These mass separated ions go into a detector and the number of ions is recorded. The mass spectrum is usually shown as a chart such as FIG. 1, which illustrates the case of ionized carbon. Note that in this case there are two significant peaks, each representing a different atomic isotope of carbon. In the figure the normalized intensity, or number of ions detected, is displayed on the vertical scale, and the mass to charge ratio (m/z, sometimes also known as Da/e) of the ion is recorded on the horizontal axis. In cases where the charge on the ion of interest is equal to one, as in the case of the singly protonated molecular ions, this mass to charge ratio (m/z) is exactly equal to the mass of the ion of interest plus the mass of the proton.

The situation is not always as simple as that shown in FIG. 1. FIGS. 17*a–c* show spectra for a single moderate sized organic molecular species containing 1–3 bromine atoms. Even though there is only a single molecular species represented in the spectrum, there are many significant large ion peaks. For example, the peaks at mass 553 indicate the base molecule of interest with all of the carbon atoms being C-12, and all of the bromine atoms being Br-79. The peak at 555 has one Br-79 replaced with the isotope Br-81, and the smaller peak between 553 and 555 is due to one C-12 being replaced by a C-13. The peaks at m/z 556 represent one Br-81 substitution and one C-13 substitution, and so on. In general there will also be lower m/z peaks that represent fragments of the original molecule and various isotope substitutions. Thus any molecule that contains carbon, bromine or a number of other well known elements having isotopes, will always have multiple peaks, making spectrum analysis difficult.

It is often possible to identify the specific molecular species generating, a MS signal by discerning its molecular weight, since different chemicals typically have different molecular weights. MS is a powerful tool in the analysis of unknown pure organic compounds because it can identify the molecular weight or mass of the compound, thus helping to identify the specific compound by limiting the number of possible compounds. MS is a useful tool, but as just demonstrated there are many ways to incorrectly identify a peak, and the analysis can be time consuming and expensive. Furthermore, if the sample of interest contains more than one compound (i.e., it is a mixture of different materials), then the mass spectrum may become even more difficult to interpret. It may not be easy to identify which particular peak in the spectrum corresponds to a specific compound in the sample introduced. Therefore, as was previously noted, to help analyze complex mixtures it is known in the prior art to do some preliminary separation of the mixture prior to introduction into the mass spectrometer by the use of gas chromatography (GC) or liquid chromatography (LC). For example LC/MS (meaning liquid chromatography/mass spectrometry), is frequently. employed in the analysis of drug metabolites in drug discovery laboratories, where it is used to identify which compound has a specific action in living creatures. It is also known to use GC/MS in environmental pollution analysis. This is typically done in cases involving volatile materials, for example dioxins or polychloronated biphenyls. It is possible to identify a specific material of interest, such as dioxin, by looking for the known mass spectrographic characteristic of a dioxin, i.e., its weight, its isotope distribution, and chromatograph retention time. In the above noted examples, the LC and GC methods are used to allow the sample of the unknown mixture of chemicals to enter the mass spectrometer in a known sequence. Preferably only one compound will enter the MS system at a time. By knowing how long it takes the material of interest to move through a gas chromatograph, it is then possible to know at what time the material will enter the mass spectrometer. Looking at the mass spectrometer output during the expected time for dioxin gives a fairly good chance of identifying the dioxin signature without having the signal cluttered by other materials whose mass spectrum may overlap that of dioxin. Thus, it is known in the art to use MS for analyzing sets of chemical compounds with the addition of gas chromatographic or liquid chromatographic separation at the beginning of the Mass Spectrometer. Such systems produce what are known as total ion chromatograms (TICs) which show the number of ions as a function of time. A typical TIC is shown in FIG. 3 for a LC/MS analysis of a mixture containing 5,000 different compounds. There is a signal peak at almost every possible time point and thus analyzing TIC data is difficult because of the large number of data points.

To help solve the data problem, it is known in the prior art to analyze GC/MS or LC/MS spectra by generating what are known as extracted ion chromatagrams (XIC) in which each mass point in the TIC spectrum in the data set is examined over the total sample time for an ion signal which corresponds to the mass of the component of interest. FIG. 4*b* shows the XIC obtained by plotting the data in the TIC of FIG. 4*a* for the m/z value 911.5 ion. The XIC contains mass to charge information in addition to the time of arrival. FIG. 4*c* is an XIC for the m/z range 911.5 to 910.5 ions These XIC charts are examined for the presence or absence of a peak, thereby either identifying the presence of an ion of interest with the expected mass, or demonstrating the absence of the expected ion. This technique works when examining mixtures of up to 20 different known compounds, but is not well suited to the analysis of hundreds of mixed compounds, because there is a high probability that two or three of those hundreds of mixed components or compounds will have similar chromatographic retention times, and thus arrive roughly simultaneously at the Mass Spectrometer. In a highly complex mixture, there may be multiple materials producing ions at any given m/z values, some or none of which correspond to the compounds of interest. Since both the TIC and XIC are difficult to interpret when examining mixtures of compounds containing hundreds to thousands of molecular species, it is possible to make a three dimensional graph such as FIG. 5, which presents both time and m/z data. FIG. 5 again shows that GC/MS or LC/MS may be useful when examining mixtures having 5 to 10 different compounds, as shown here, but the number of peaks is too high for simple analysis if the number of different compounds exceeds 20 or so.

There exist problems with automated Mass Spectrometer analysis in the art. One such problem is that the software is limited to the specific set of problems for which it is designed. There are no software packages capable of general automated analysis of Mass Spectrographic mixtures of compounds. Problems in automated analysis of complex mixtures include the likelihood that some ions will be observed at almost every m/z ratio (i.e., mass to charge ratio) everywhere within the experimental sample. For example, refer again to FIG. 3, showing a LC/MS chromatogram TIC, showing the number of ions detected versus time from a complex mixture containing roughly five thousand different components. It is clear from FIG. 3 that there is an ion peak at every time point in the range. FIG. 4*b* is a XIC spectrum that shows that there are positive XIC at m/z ratio 911.5 at many places in the course of the MS run. The large number of peaks is due in part to each compound having multiple peaks as discussed above because of isotopes. There may also be peaks that result from multiply charged components with twice the weight and twice the charge. There may be peaks from various chemical contamination or noise. There may be peaks due to electronic noise or system resolution limits. Thus, automated analysis methods can not find the preprogramed peaks, because it is not clear from the XIC alone whether the signal at the expected m/z ratio of the compound of interest is a real indication of the presence of the expected compound, or whether it is a false signal due to an isotope of a different compound, etc. All of the above noted problems exist in the art of mass spectrographic analysis, whether automated or manual.

To summarize the problems in the art, the isotope pattern problem discussed above typically appears as two or more peaks with slightly different masses, typically one mass unit different. This is due to the fact that most elements in organic synthesis contain carbon. They contain isotopes of carbon in the normal proportion in which carbon isotopes exist in the world as a whole. The relative abundance of carbon-12 versus carbon-13 on the earth is C-12 at 98.9% and C-13 at 1.1% respectively, in any naturally occurring sample of carbon. Each of these different carbon isotopes have identical chemical values and have weights that differ by one Dalton. For a molecule containing 100 carbon atoms the probability of there being one C-13 at any one site is 1.1%, the probability of any other site being C-12 or C-13 is unaffected by the selection at any other site. Therefore the probability of there being one single C-13 among the 100 carbon atoms is given by (100*1.1%)=110, meaning that there will be two peaks, the lighter peak having all 100 C-12 atoms, and a second peak that is 11% taller than the first peak and located one m/z unit higher. See for example FIG. 15. Thus, a compound having a hundred carbon atoms would be likely to have one of the one hundred C-12 atoms replaced by a C-13 atom. As a result of the substitution of one of the one hundred C-12 atoms by a C-13 atom, the MS spectrum of the molecule is likely to have two peaks of roughly equal height separated by one mass unit. The roughly equal height of the two isotope peaks indicates that about half of the individual molecules of this compound have had a random one of the C-12 atoms replaced by a C-13 atom. One peak represents the molecule containing all C-12 atoms, and the second peak at one Dalton higher representing the same chemical molecule, containing C-12 atoms plus one C-13 atom. Further, there will be yet another peak having about 61% of the height of the first peak, in which there will be two random C-12 atoms replaced by C-13 atoms, thus resulting in a mass two Daltons higher than the base isotope molecule. There are further carbon isotope mass spectra peaks representing three C-13 substitutions and having about 22% of the height of the first C-12 peak, and so on. Thus, any compound containing carbon will always produce multiple mass spectra peaks, large organic molecules containing in 80 to 100 carbons will appear as two relatively large peaks separated by one m/z unit, and present automated MS analysis tools may misidentify an isotope peak as a compound of interest. Thus, standard MS analysis has a problem with large organic molecules, because it is difficult to identify or separate the multiple molecular peaks due to various carbon atomic isotopes.

Another problem with analyzing MS data is that the XIC peak found at the expected mass ratio may be a false signal due to background noise. Noise contaminants may be caused by electrical noise in the MS equipment or the GC/LC equipment, or to contaminants in the GC/MS system, or there may be contaminants in the solvent systems used to carry the molecular mixture. There may also be false positive identifications related to the resolution level of the equipment.

Thus, there exists a need in the art for an automated method for analyzing mass spectrometer data which can analyze complex mixtures containing many thousands of components and can correct for background noise, multiply charged peaks and atomic isotope peaks.

SUMMARY OF THE INVENTION

The invention resides in a method for analyzing mass spectrometer data in which a control sample measurement is performed providing a background noise check. The peak height and width values at each, m/z ratio as a function of time are stored in a memory. A mass spectrometer operation on a material to be analyzed is performed and the peak height and width values at each m/z ratio versus time are stored in a second memory location. The mass spectrometer operation on the material to be analyzed is repeated a fixed number of times and the stored control sample values at each m/z ratio level at each time increment are subtracted from each corresponding one from the operational runs, thus producing a difference value at each mass ratio for each of the multiple runs at each time increment. If the MS value minus the background noise does not exceed a preset value, the m/z ratio data point is not recorded, thus eliminating background noise, chemical noise and false positive peaks from the mass spectrometer data. The stored data for each of the multiple runs is then compared to a predetermined value at each m/z ratio and the resultant series of peaks, which are now determined to be above the background, is stored in the m/z points in which the peaks are of significance A technique for automatically analyzing mass spectrographic data from mixtures of chemical compounds has a series of screens designed to eliminate or reduce incorrect peak identifications due to background noise, system resolution, system contamination, multiply charged ions and isotope substitutions. The technique performs a mass spectrum operation on a control sample, producing a first group of output values. Next, perform a mass spectrographic operation on a sample to be analyzed, producing a second group of output values. Select a first m/z ratio for a material expected to be present in the mixture from a predetermined library of calculated mass spectrometer output spectrums and subtract the value of the control sample at the expected output value from the value of the analyzed sample, and compare the difference to a predetermined value. If the value is greater than the predetermined value thus indicating that the signal is above the background noise level, generating a record at that m/z value for an expected material. Performing the same mass spectrum operation several times to eliminate random noise and background contamination. Next, identify peak values that do not have the expected peak width or proper retention time for the separation method. Identify multiply charged ions by examining peak separation. Examine the m/z location of the expected material and compare intensity at the expected m/z location with the intensity at the next lower m/z recorded peak to identify peaks related to atomic isotope substitution. With such a technique, mass spectrograph data analysis may be greatly simplified by the identification of probable spurious signals, and analysis will become simpler and more accurate.

A control sample or reference sample can be a sample against which a series of future MS values or experiments is compared, or the results of an experiment can be treated in effect as a control sample against which one or more subsequent MS values are compared. A peak in one experiment may indicate a desired compound, but such a peak in a series of experiments may suggest a contaminant rather than a desired compound.

In a further embodiment, the MS peaks are then examined by comparison to a library of expected MS output spectrums, by taking an expected m/z ratio from the library of materials thought to exist within the mixture analyzed and comparing to the values found at each m/z ratio. If a signal peak exists in the memory at the m/z ratio corresponding to the value expected for any specific chemical in the library, the data is then examined by checking whether or not the expected m/z ratio has a chromatographic peak temporal position and width that approximates the expected peak of the expected chemical compound. This determines whether or not the peak possibly matches the chemical whose presence is expected in the sample.

In a further embodiment of the invention, the value at the m/z ratio of the expected compound, after being found to be above background and of the approximate peak width expected for the separation method used, is then compared to the value at the peak in the data sample having the next higher m/z ratio. If by taking the two values of m/z ratio, measuring the distance and inverting the value, it is found that if the peak spacing is one full m/z ratio unit, then the ion charge is one. On the other hand, if the second peak is due to a doubly charged ion, then the peaks will be found to be separated by one half of a m/z unit. Similarly, a m/z spacing of one third of a m/z unit indicates a triply charged ion. Thus it is possible to positively identify doubly charged and triply charged ions.

In a further embodiment, eliminating false positive peaks due to atomic isotope substitution is performed by comparing an expected m/z ratio peak, that has been found in the previous tests have reasonable intensity and chromatographic peak width (i.e., to be above the background level), has the expected mass-to-charge (i.e., m/z), and has the correct charge (hence the correct mass), against the next lower m/z ratio peak by subtracting the peak intensity value of the target of interest from the next peak lower in the spectrum by the value equal to 1 divided by the charge of the ion. Thus if the previous test showed that the charge state was 1, then the next lower peak examined. would be one m/z unit lower. If the charge state was found to be 2, then the next lower peak examined would be one half of a m/z unit lower, and so on. A general formula for this relationship is given as peak difference $=I_m-I_{(m-(1/z))}$, where $I_m$ is the intensity of the m/z ratio under consideration, m is the m/z value of the signal under consideration, and z is the charge of the ion. The same result may be obtained by simply reversing the order of the direction of peak subtraction and looking for a value that is less than zero. Isotope peaks for most moderate size organic molecules having fewer than about 80 carbon atoms typically decline at higher m/z values. Subtracting the two peak values and getting a negative number indicates that the lighter peak is of higher intensity, thus the peak being examined can be assumed to be an isotope of a lighter molecular species, not a peak of the expected molecular species, and eliminated.

An example of a situation where the invention may be beneficial is found in drug testing. If a chemical is needed to bond to a specific protein, it is possible to fabricate a large number of different small chemicals known as ligands which may bond to protein. The different chemicals may bond to the protein with different strengths. The point of interest is to find the ligand that sticks best. Placing the protein in a bath of perhaps as many as 5,000 possible ligands, (i.e., a library), and then washing the ligands off of the protein will result in a few of the ligands sticking to the protein. Which ligands stick best may be determined by using LC/MS to determine which of the known 5,000 ligands used are found. First the protein is placed in the LC/MS without having been bathed in the ligands and a background value is recorded. This step will be used to eliminate what is known as chemical noise, resulting from protein breakdown products, contaminated solvents and buffers, machine contamination, previous chemicals used in the LC/MS etc, as well as system electronic noise. Next, the protein that has been bathed in the ligands and washed is placed in the LC/MS and the output is compared to the background at each m/z point where one of the 5,000 ligands is calculated to exist. If the expected ligand signal is above the measured background level, a possible hit is recorded. The suspected ligand signal is compared versus the time of arrival at the MS for the expected time for the specific ligand to traverse the LC system.

If the suspected ligand passes the above two tests, then the fact that any molecule containing carbon will have multiple m/z peaks is used, and the suspected ligand m/z peak is compared to the next lower peak and higher m/z peaks. If the peaks are found to be separated by one full m/z unit, then the suspect peak is due to singly charged ions and still may be a possible ligand. If the peak separation is one halt of a unit, then the peak is due to doubly charged ions, and so forth. The doubly charged ion may still be useful, but the correct identification of the ligand responsible will require that the expected mass be calculated differently. The multiple isotope situation also allows the system to determine if the suspect peak is the expected ligand or an isotope peak of some other signal. Again the neighboring peaks are examined, those one m/z unit away in the case of singly ionized molecules and one half of a unit away in the case of doubly charged ions, and the relative sizes of the peaks are compared. For chemicals having fewer than 80 carbon atoms, it is known that the lighter value peaks will be larger than the C-13 substituted peaks, and this fact is used to determine if the suspected is simply a heavier isotope of some other chemical. In this manner the number of peaks that need to be examined by a user is greatly reduced.

Another example of the use of the present invention is found in drug metabolite studies. A potential drug is given to a test animal such as a rat. The user generates a list of possible breakdown products (i.e., metabolites) that may be found in the rat's blood. A sample of the rat's blood is taken and examined before the drug is given, thus providing a background level. The blood of rats given the drug is examined for the presence of the suspected metabolites using the method described above of subtracting the background and wrong time of arrival signals, flagging doubly charged ions and ions whose peak heights indicate that isotopes of a different compound may be responsible. In this manner the presence of possible dangerous metabolic byproducts of a drug may be determined.

With such an arrangement, it is possible to automatically reduce the number of MS peaks which need to be examined, by flagging peaks that are due to background noise, isotope substitution, and multiply charged ions. Since it is beneficial to eliminate false peaks from mass spectrographs of complex mixtures in order to enable rapid and accurate analysis of MS spectrums, the present invention solves a known problem in the art of mass spectrometry.

BRIEF DESCRIPTION OF THE DRAWINGS

The above and further advantages of the invention may be better understood by referring to the following description in conjunction with the drawings in which:

FIG. 12 shows an input screen;

FIG. 13 shows a mass search list screen;

FIG. 14 shows an illustrative output file;

Figure 1:
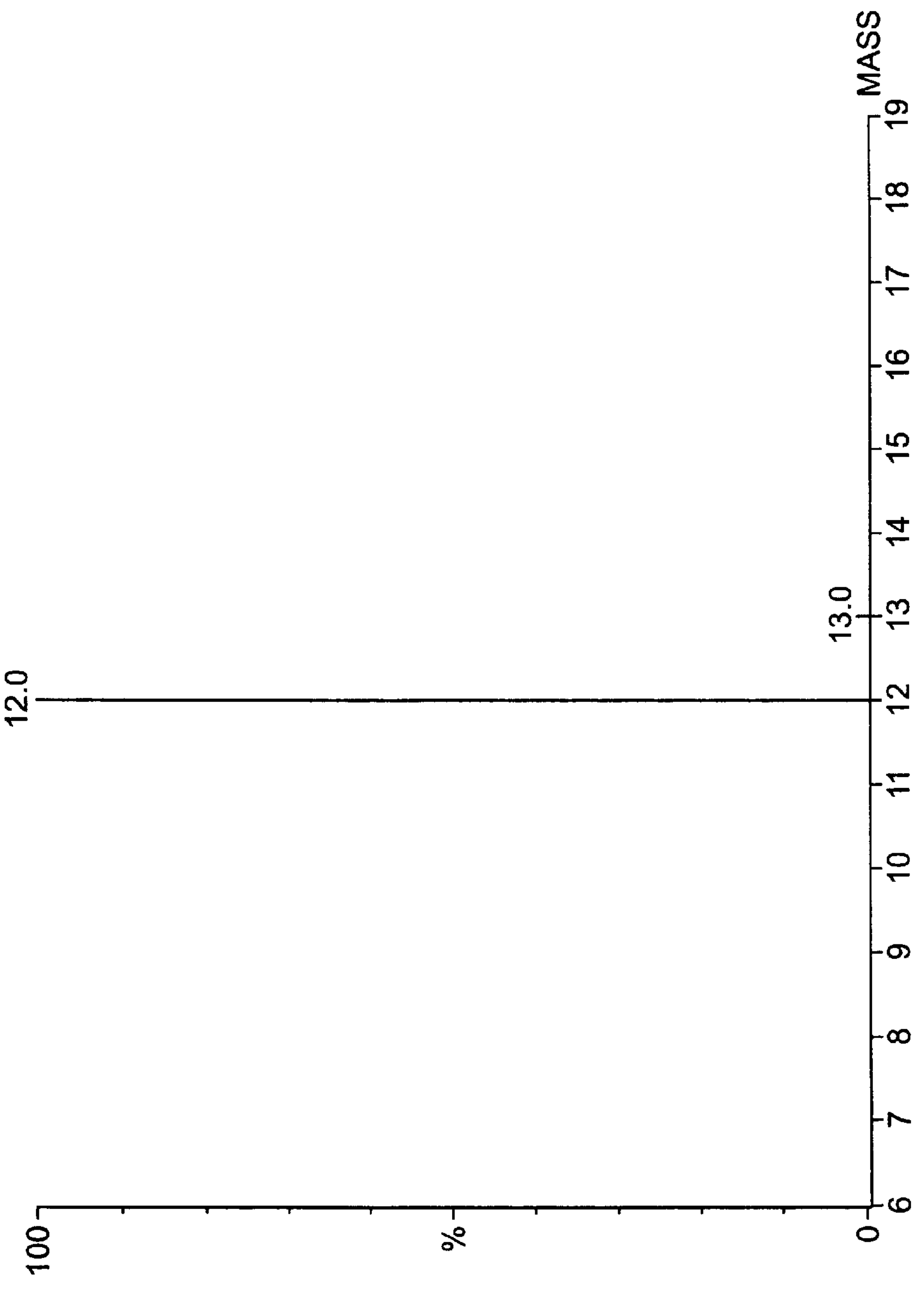
FIG. 1 is a mass spectrum showing the isotope pattern for carbon.

The foregoing and other objects, features and advantages of the invention will be apparent from the following more particular detailed description of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

FIG. 1 shows a mass spectral isotope pattern for carbon. The line labeled 12 shows that 98.9% of carbon atoms are found at a mass ratio shown on the horizontal axis as 12.0 (i.e., C-12). There is also a smaller peak at line 13 labeled 13.0, showing that 1.1% of naturally occurring carbon is in the form of Carbon-13 (C-13). As a result of this natural distribution of carbon isotopes, it is useful to look for secondary MS peaks and tertiary peaks for all organic molecules, one peak where the total molecular weight (usually measured in units known as Daltons) is due to having every carbon atom in the molecule being C-12, and a second peak having a molecular weight that is one mass unit higher due to having one of the C-12 atoms replaced by C-13, and so on. The relative height of the two isotopic peaks depends on elemental composition of the compound of interest. For typical, moderately sized organic molecules (i.e., 80 or fewer carbon atoms per molecule) it will be found that the two MS peaks will always have the greater ion magnitude at the lower m/z value since the singly C-13 substituted isotope will be less frequent than the non substituted molecule. This allows automatic decisions as to whether or not a particular MS peak at an expected m/z value is the correct molecule, or simply a false positive due to a lighter molecule's isotope peak.

Figure 2A:
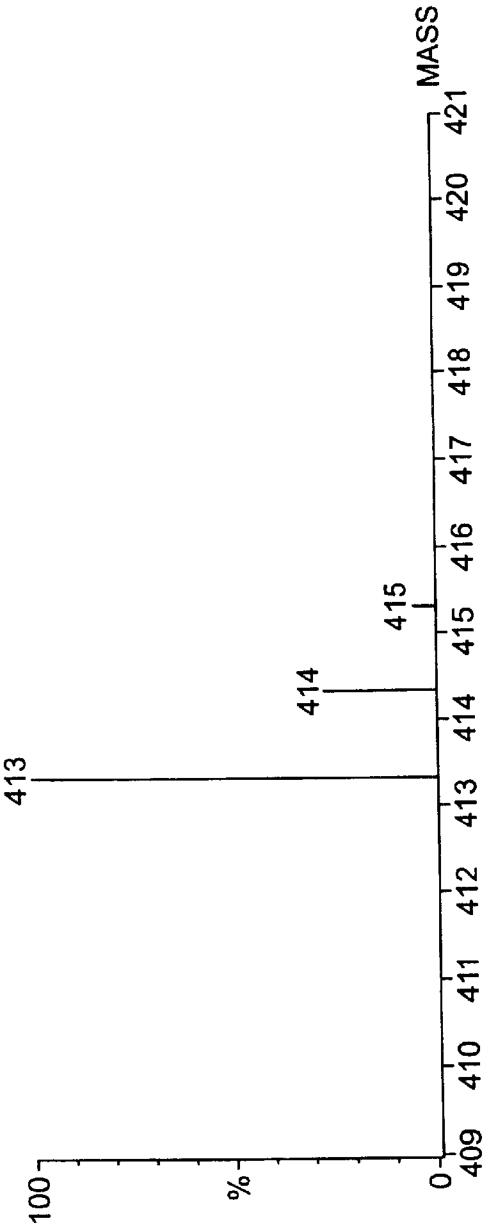
FIGS. 2*a* and 2*b* are charts showing mass spectrums.
Figure 2B:
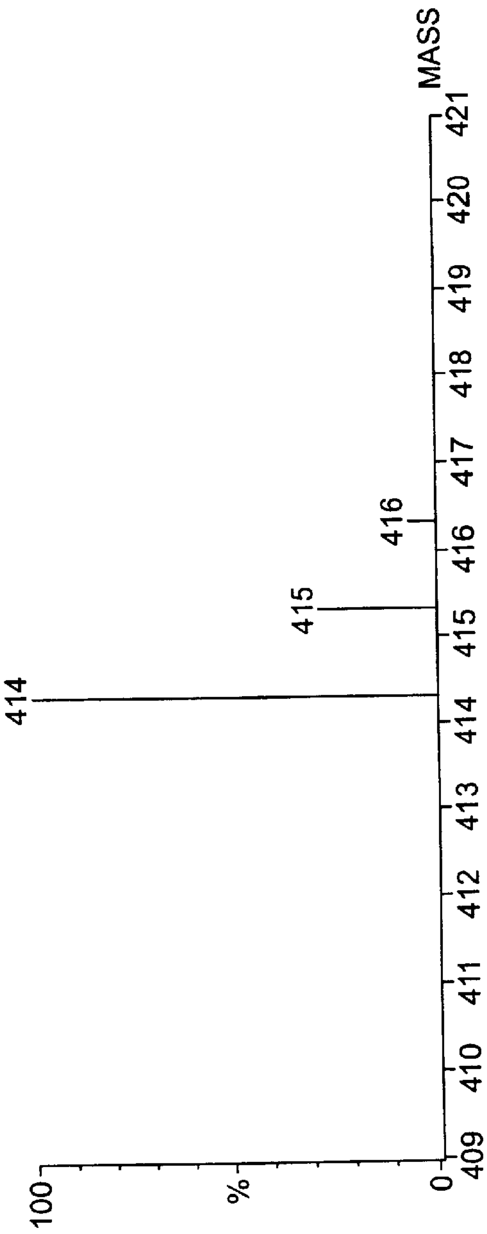

FIGS. 2A and 2B shows a typical MS spectrum showing relative abundance to m/z ratio for two different molecules having similar mass. As discussed above with reference to FIG. 1, notice that the lowest m/z peak 413 in FIG. 2A and 414 in FIG. 2B have the greatest intensity. The peaks in both figures that are one m/z unit higher represent the same molecules having one C-12 atom replaced by a C-13. These isotope peaks are smaller than the base molecule for the reasons described previously.

In this illustrative example, FIG. 2A may be thought of as an unexpected chemical from a drug design experiment. FIG. 2B may be thought of as an expected ligand from the same drug design experiment. When the MS analysis is done on the ligand sticking experiment, the data will be examined for the presence of the expected molecule in FIG. 2B having a m/z peak at 414. Assume that the expected molecule in FIG. 2B did not stick to the protein in this example, and is not present, but that the molecule in FIG. 2A is a contaminant. The potential for misidentifying the m/z 414 isotope peak in FIG. 2A as the expected (but missing) non isotope 414 peak from FIG. 2B is due to the relatively large size of isotope peak 414 in FIG. 2A. The present invention allows automatic identification of such an unexpected compound as shown in FIG. 2A, by use of the fact previously discussed, that within a single compound spectra the lowest m/z value has the largest peak. Thus the 414 peak from the unexpected compound in FIG. 2A. will not be misidentified as the expected 414 peak from FIG. 2B because the system will compare the peak at 414 with the larger peak at 413 and flag the 414 peak as an isotope peak of an unexpected compound.

It is possible to incorrectly identify a doubly charged ion peak from a molecule having twice the weight of the expected library compound. For example, the peak 414 of FIG. 2B might also be due to a doubly ionized compound with a 828 weight. Identification of these false positive cases, or to identify the correct compound having a double charge, is performed by examining the spacing of the isotope peaks discussed above. Peaks that are at the expected m/z value of the library compound and have been previously found to exceed to background level and to have arrived at the MS at the expected time, are compared to the neighboring peaks. If the separation of the peaks is exactly one m/z unit apart, as shown in the figure where peaks labeled 414, 415 and 416 are one unit apart, then the molecule which has been detected is singly ionized. If the peaks are found to be one half unit apart, for example if the second peak was at 414.5, then the ion is doubly charged, and so on.

FIG. 2A shows that peak 413 is larger than the one directly above it, 414, which represents the same compound having one carbon atom replaced by carbon 13. Therefore you would ignore the data in FIG. 2A at 414 as merely being an isotope. Since the peak spacing is one m/z unit, the ion measured is singly ionized. These examples demonstrate the present invention method of eliminating false positive peaks and reduces the number of data points that need to be examined to identify specific drug metabolites or pollutants.

Figure 3:
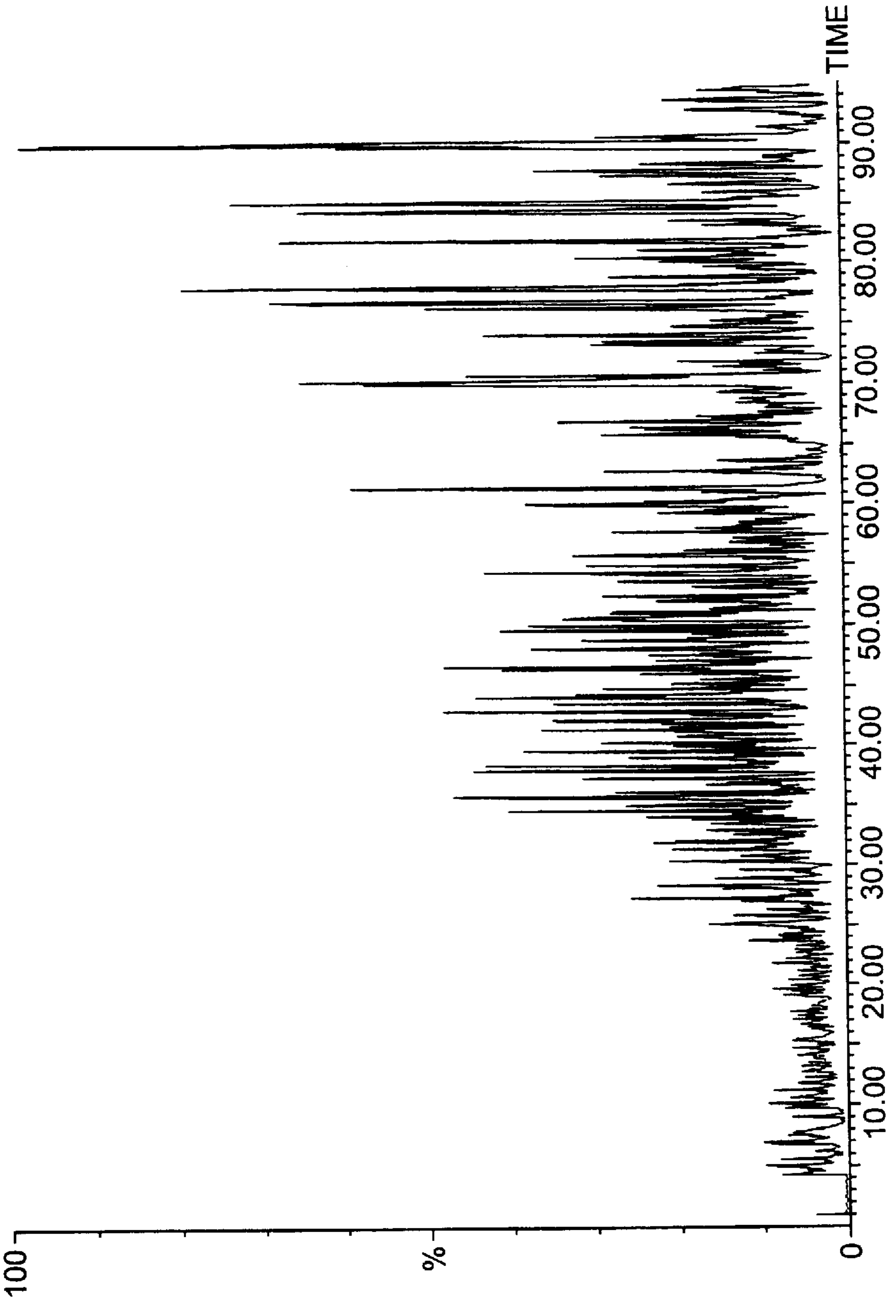
FIG. 3 is a LC/MS analysis of a 5,000 component library.

FIG. 3 shows a LC/MS analysis of a library of possible compounds containing 5,000 different molecular species. This is known as a total ion current or TIC, and measures the number of ions detected versus time. Analysis of a MS of this mixture would be very complex without using the present method, since there are too many peaks to easily separate the different species from each other.

Figure 4A:
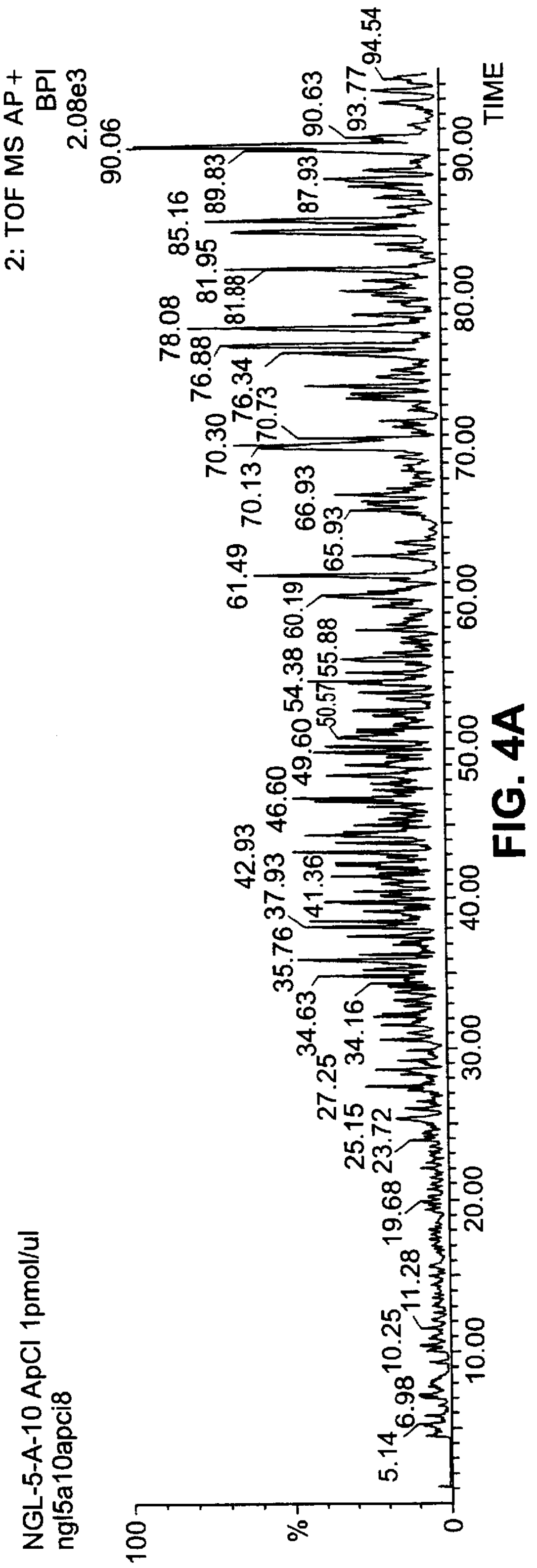
FIGS. 4*a–c* are XIC Spectrums.
Figure 4B:
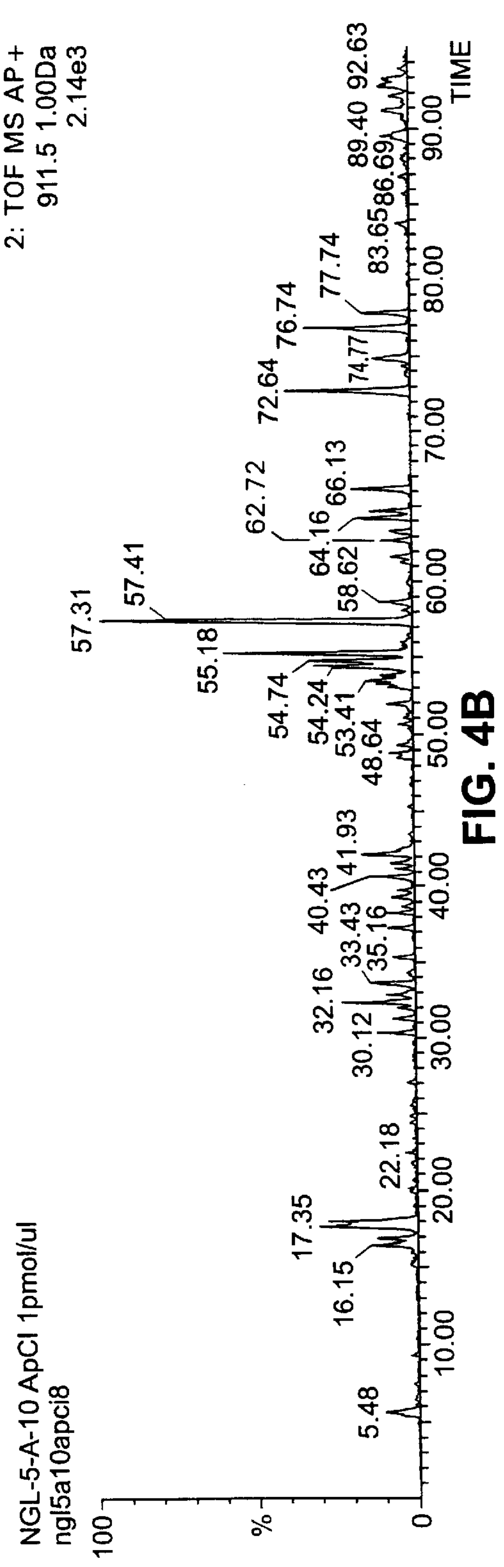
Figure 4C:
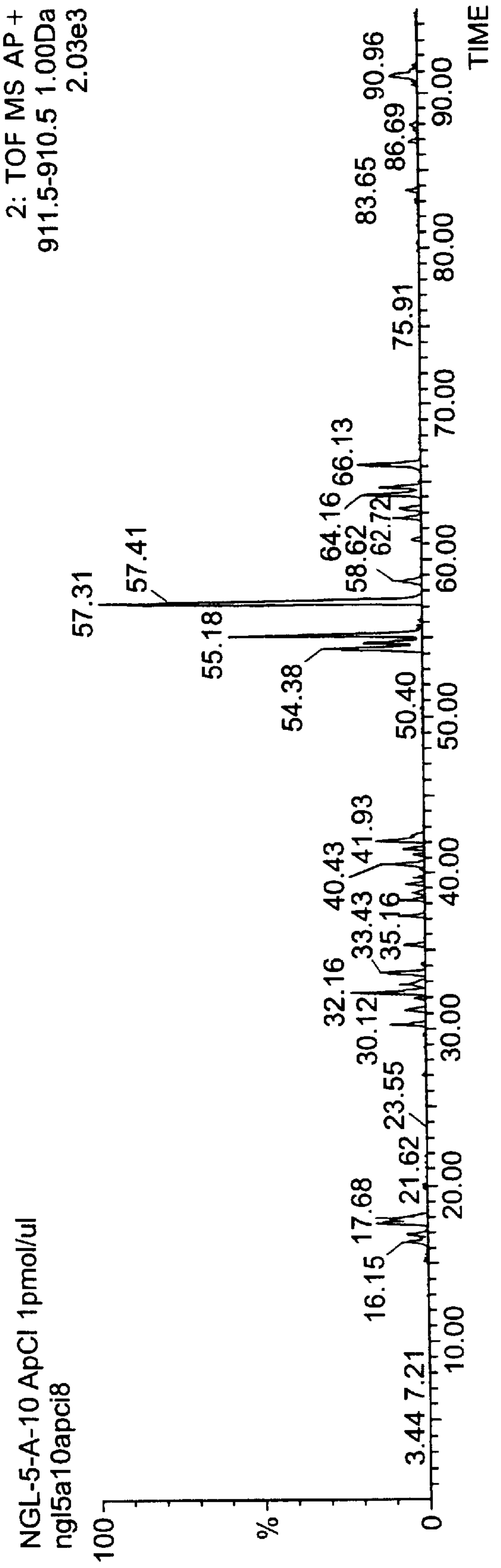

FIG. 4A shows a TIC chart similar to that given in FIG. 3. FIG. 4B shows the same data, but given as the ions with m/z value of 911.5 detected verus time. This is known as an extracted ion chromatogram or XIC. FIG. 4C again shows the same data but with the m/z ratios between 911.5 to 910.5 versus time. The method for elimination of false positive isotope peaks consists of examining the MS peak that corresponds to the predetermined library compound's m/z value. If the peak is above the background noise and above the level of the control sample, then the data is plotted in an XIC. The XIC is basically looking at one particular m/z value over the entire time period of the sample. Different chemicals that have the same molecular mass, and therefore the same m/z values, are likely to have different diffusion rates and different chromatagraph residence times. If the library compound matches the observed time delay of the data, then there may be a correct identification. There follows an automatic peak charge state determination. If the charge is found to be +1, the isotope test is performed on the m/z value that is one unit lower in value than the peak under examination. If the charge state is found to be +2, then the isotope test is performed of the m/z value that is one half unit lower in value. If the charge is +3, the isotope test looks at the m/z one third unit lower and so on. In this fashion the system flags peaks that are not from the expected compounds, and thus greatly simplifies MS analysis.

Figure 5:
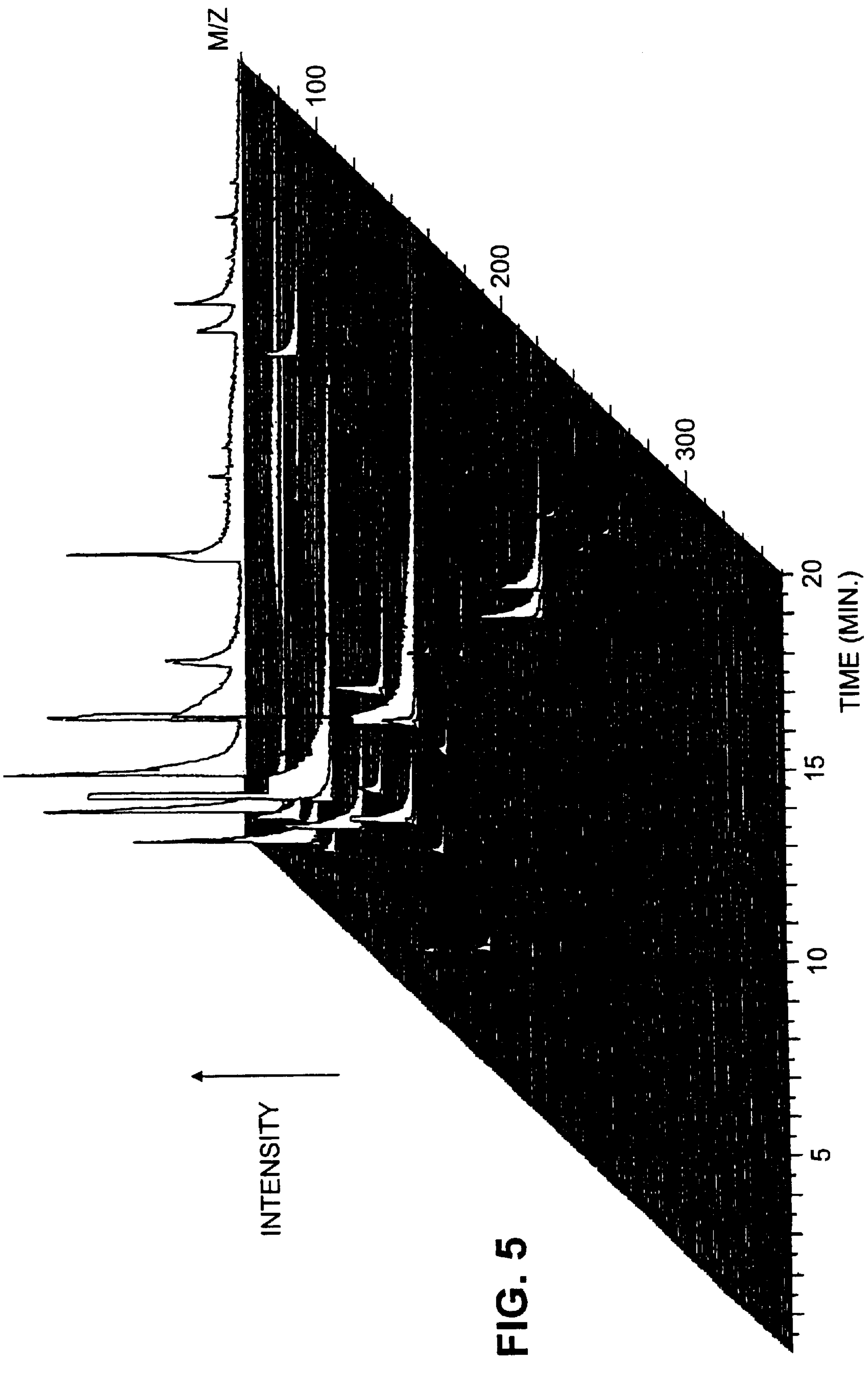
FIG. 5 is a three dimensional mass spectrum.

FIG. 5 shows another method of graphically displaying MS data, using three axis of intensity versus m/z and versus time, thus combining the data of the TIC and XIC graphs. The data shown in FIG. 5 is easier to understand than the previous two figures, but still does not provide accurate analytic capability for mixtures of more than 5 to 10 compounds. A problem with XIC analysis is shown by the series of vertical peaks indicating that ions were detected on the same m/z value, for instance the two peaks along m/z value 250. These indicate two different compounds having the same m/z value. That they represent different compounds is shown by the different times of arrival from the chromatography system.

Figure 6:
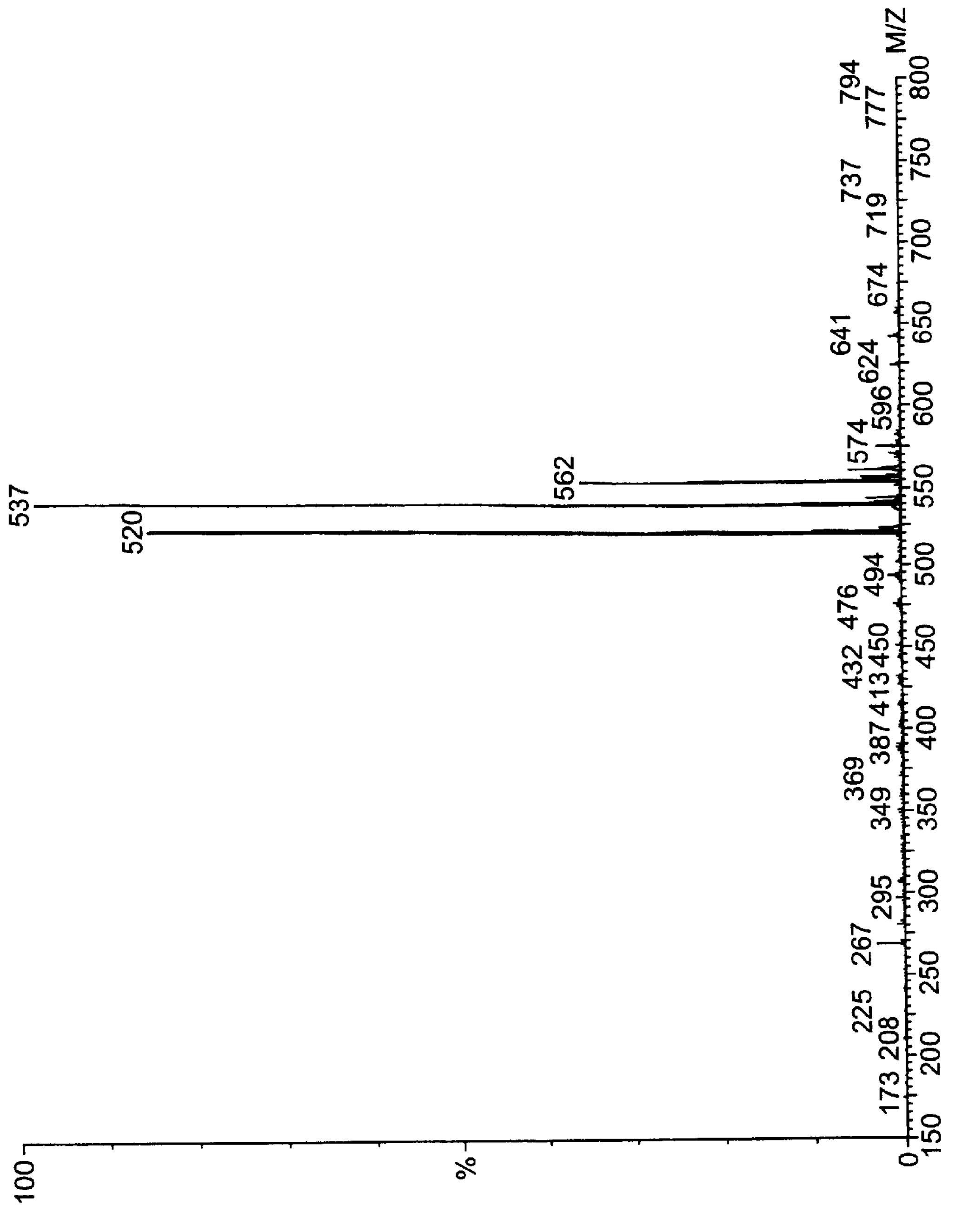
FIG. 6 is a mass spectrum showing signal to noise.

FIG. 6 shows a typical XIC wherein the peak of interest is at m/z 574 and labeled 10. Peak 574 has 17,800 ions counted. To determine if peak 574 is significant, particularly when compared to the much larger peaks found around m/z 537, it is useful for the analysis to compare the measured value to a background level.

Figure 7:
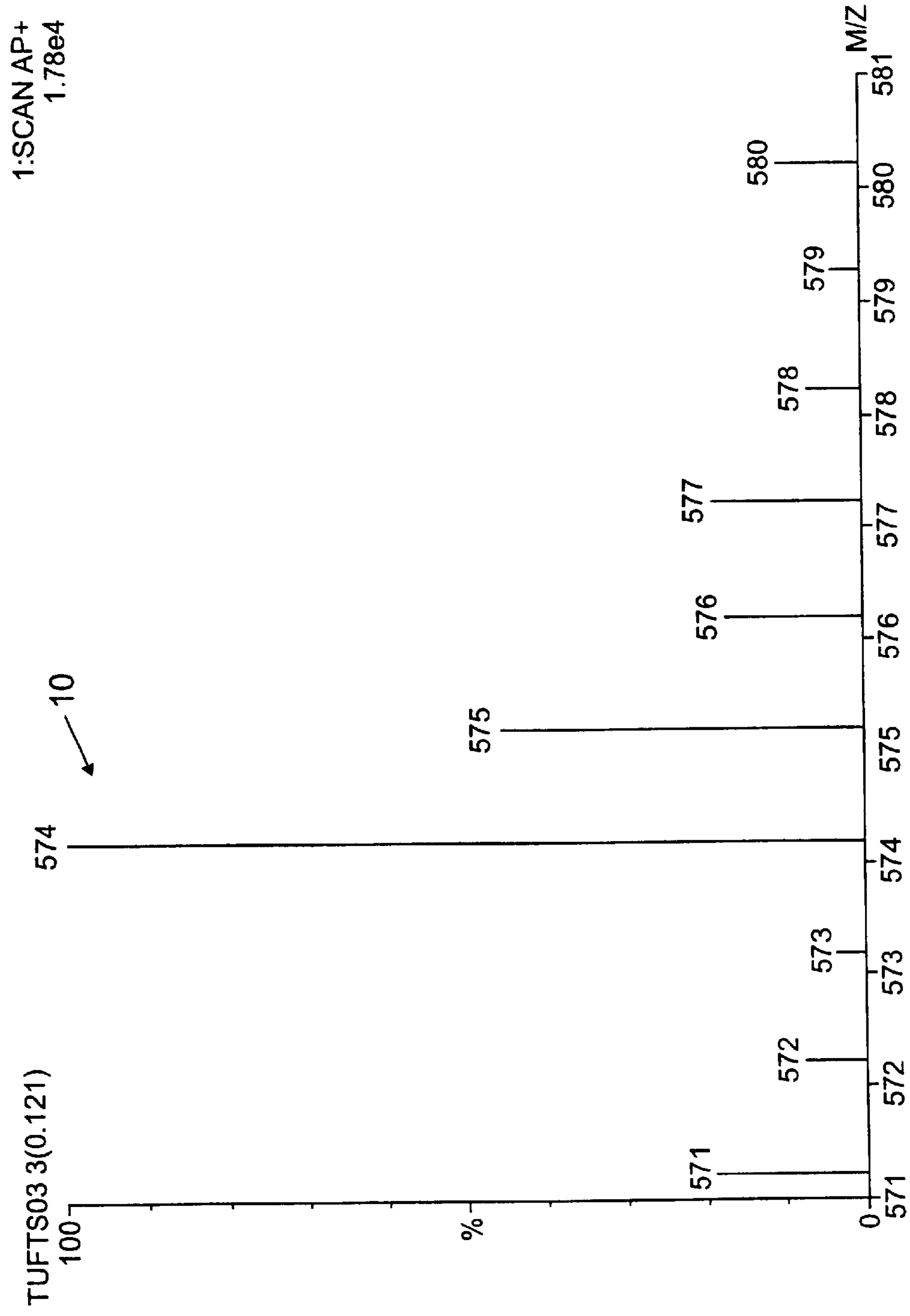
FIG. 7 is an expansion of FIG. 6.
Figure 8:
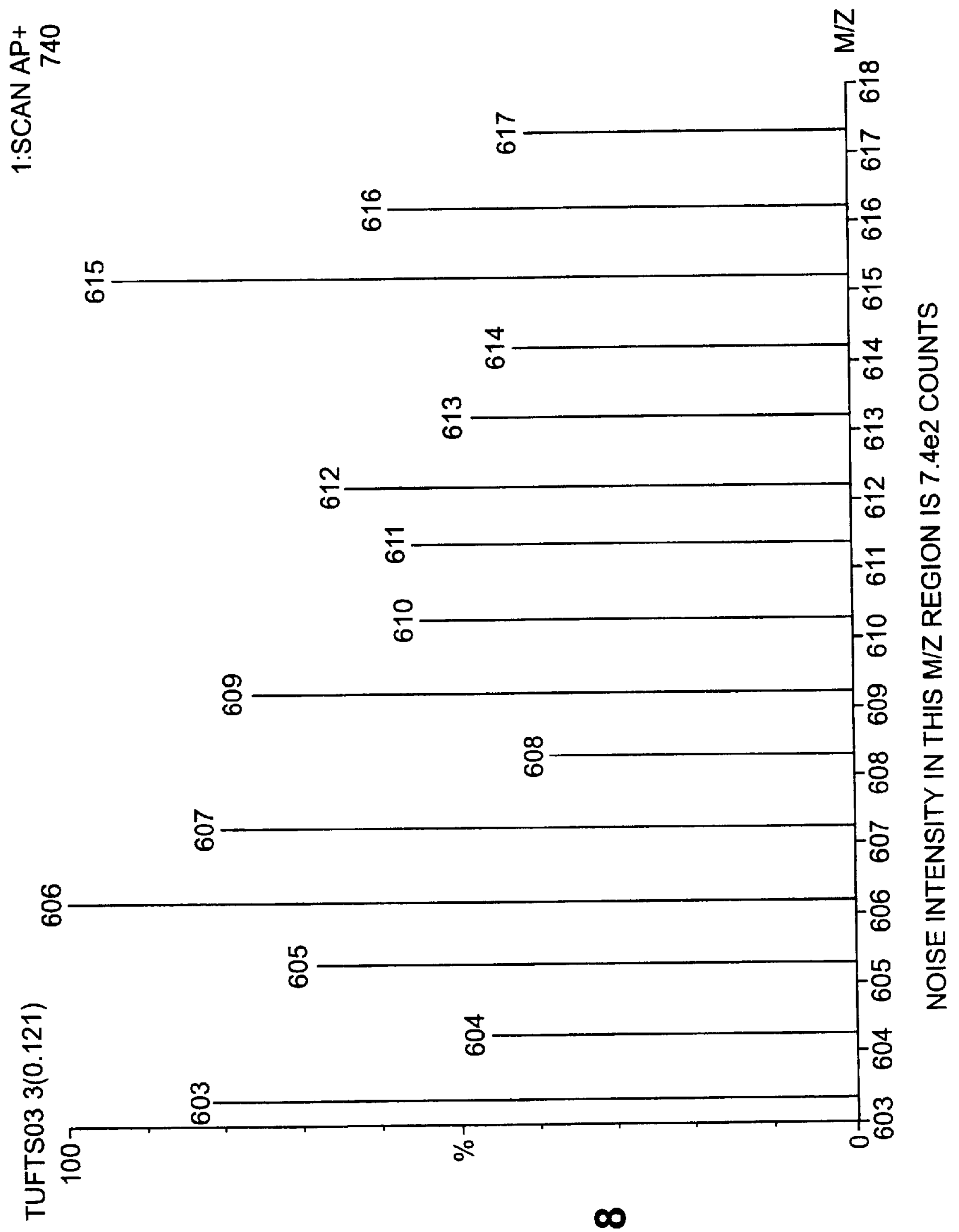
FIG. 8 shows the background noise.

FIG. 7 is an expansion of FIG. 6 around the peak of interest at m/z 574. By comparison to the background MS done for example, on the protein without ligands discussed previously, it is found that the background value in this general region is around 740 counts as shown in FIG. 8. Thus the expected peak at m/z 574 can be automatically shown to he above the background level in this region and with this level of chemical and electronic noise. The specific background level depends on the equipment and its state of repair, the cleanliness of the solvents used to transport the compounds, etc. The acceptable signal to noise ratio depends upon these and other factors, but in a typical system the signal to background noise level may be expected to exceed 3:1 or more.

Figure 9:
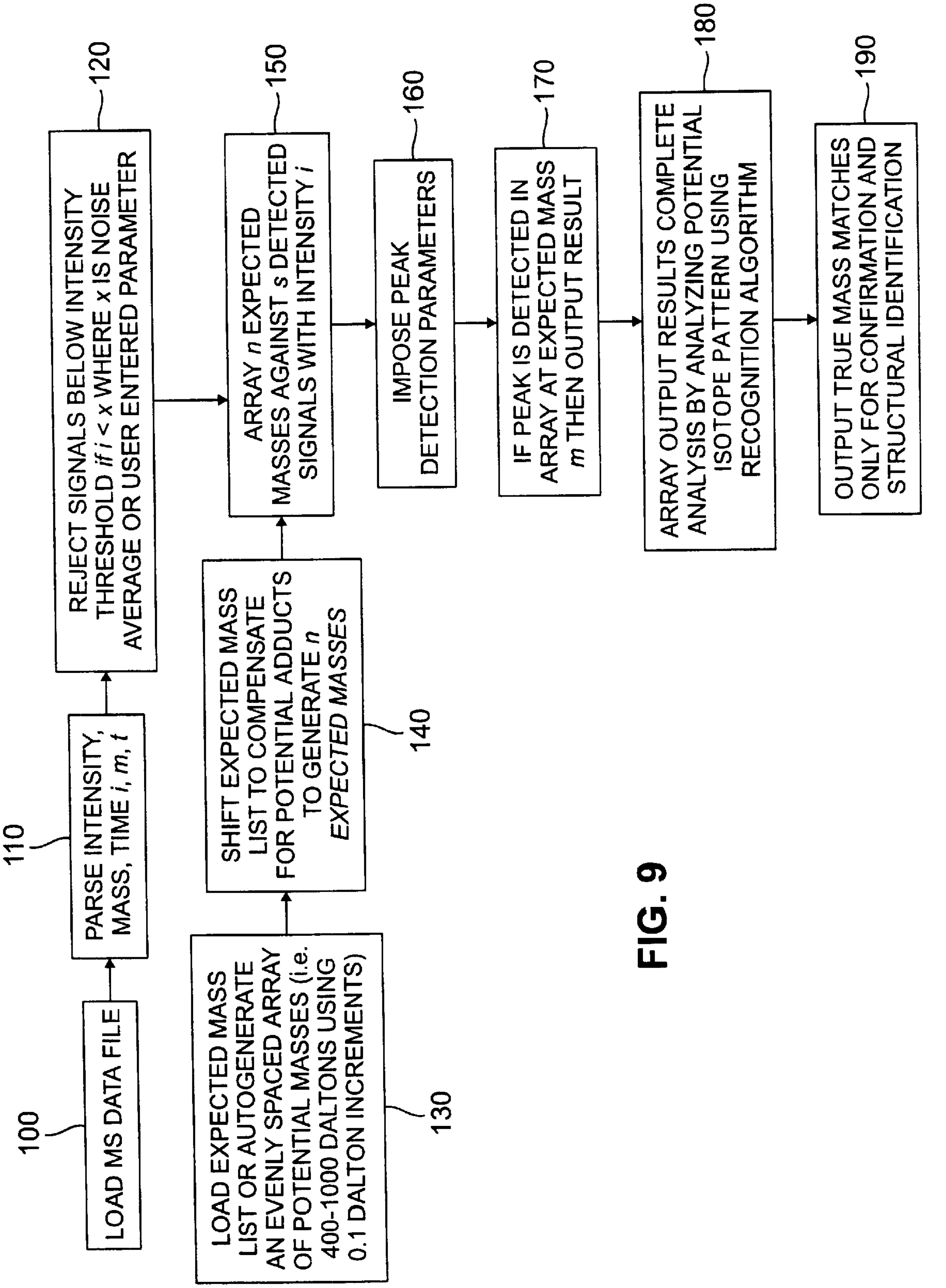
FIG. 9 is a flowchart in accordance with the invention.

FIG. 9 is flowchart showing the details of a preferred embodiment of the invention. Any one of many common computer languages, such as C++ may be used to implement the invention. In step 100 the ion counts detected by the MS system are recorded. In step 110 the MS data is separated into TIC and XIC graphs. Step 120 compares the signal to a predetermined threshold, as discussed above with reference to FIGS. 6–8, and which may be a fixed reference signal or a signal from a prior experiment, and any signals below either the noise average value or a user inserted value are rejected. Step 130 generates a list of m/z locations to examine. The list is either a search list having evenly spaced intervals, or a library of expected compounds. Typically a search list is used if there are no known compounds in the mixture, and a preferred embodiment of the invention uses a spacing of 0.1 Daltons in mass. Step 140 adds or subtracts the mass of the added or subtracted ion, as discussed in the background. A singly protonated molecule of mass 413 would have one unit added for the proton (i.e., a hydrogen) and be looked for at m/z 414. If a sodium ion had been added, then the added mass would be 23 Daltons, and the search would be at m/z 436. The same is true if the ion was created by removing a hydrogen. The search in this case would occur at m/z 412.

Step 150 creates a memory that compares the measured data that is above the background with the expected compounds and searches for a match. Step 160 looks at the matched peaks one at a time and checks the time of arrival of the peak at the MS, and checks the ion charge state as discussed above with reference to FIGS. 2–5. Step 170 takes all the peaks that pass the previous screens and compares the isotope peak values using the charge state as determined in step 160 to determine the proper peaks to examine for isotope values, the peaks being separated by one m/z unit if the charge state had been determined to be one in step 160, as discussed previously with reference to FIGS. 2–5. Step 180 outputs to the user only those peaks that have been determined by the method to be possible matches to the library, or in the case of a search, those that meet all of the criteria discussed above and may be identified by standard MS analysis.

The measured data against which a library of expected compounds or stepped values are compared can be a single unchanged set of data. Alternatively, an experimental result can be compared to a prior experimental result, thus effectively making the determination of a control sample dynamic. In the latter case, comparing sets of data from multiple experiments can help eliminate false positive peaks. If apparently desirable peaks occur in multiple samples, it is more likely that the peak is a contaminant and not a desired peak.

Figure 10:
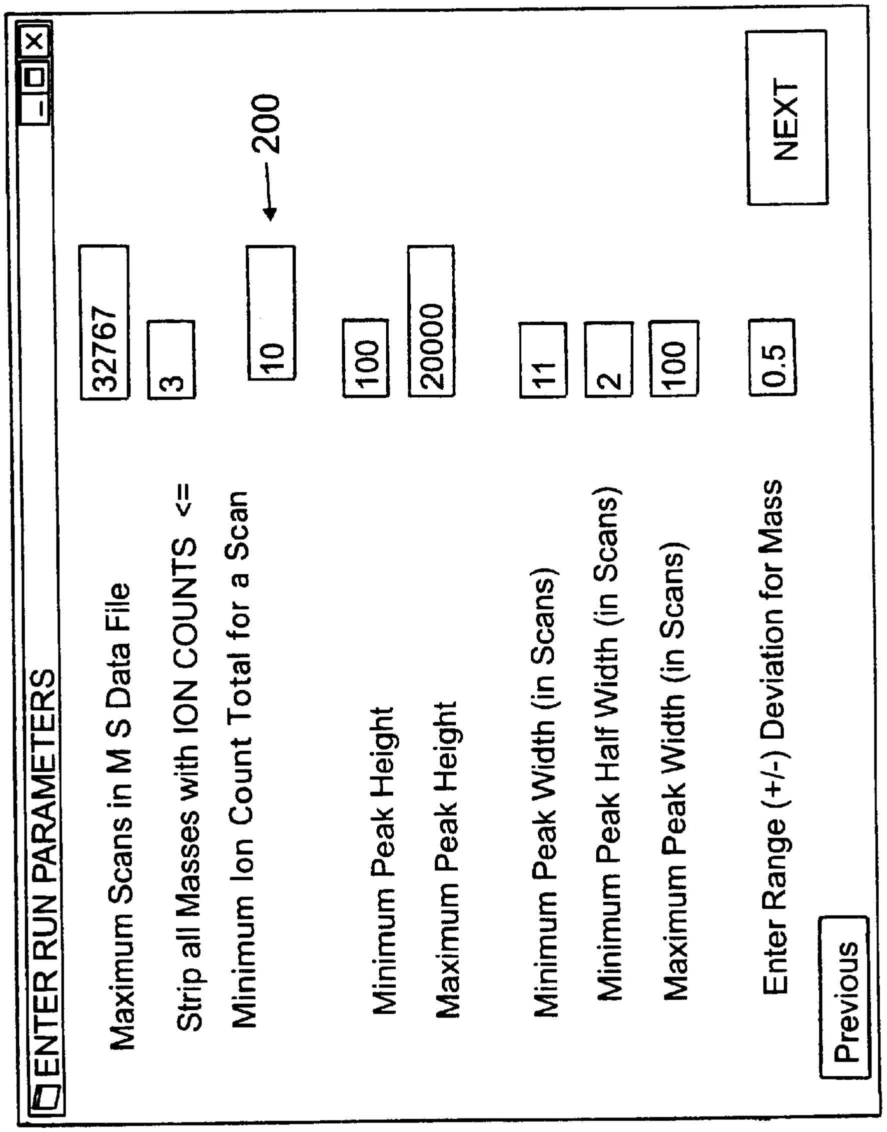
FIG. 10 shows an illustrative parameter screen.
Figure 11:
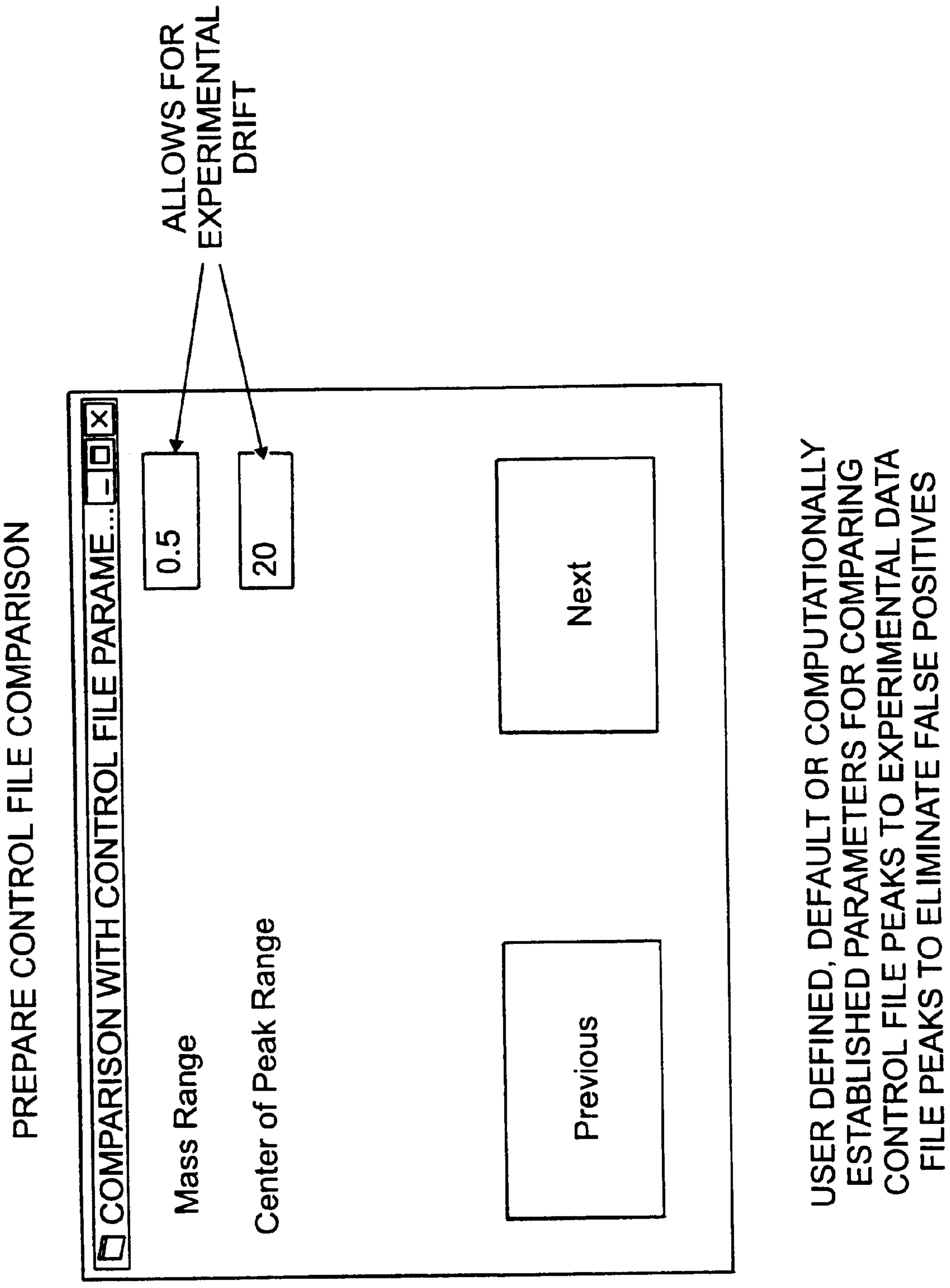
FIG. 11 shows a control screen.

FIG. 10 shows a typical input file format of the peak detection parameters the user may enter to further decrease the number of mass peaks that will require manual operator intervention. For example, the input 200 will eliminate any peak that does not at least have 10 ions counted. This might be due to user information regarding the resolution limit of the particular LC system in use. FIG. 11 also shows user inputs limiting data detection due to expected peak width through the LC or GC system and allowance for experiment drift or calibration errors. FIG. 12 shows the possible parameters for use in the search mode. The masses may be shifted by the correct amount to match the particular ionization method used to generate the ions. FIG. 13 shows a library of expected compounds that is generated by the user and depends upon the specific compounds that are expected to have been formed, for example, in a lab rat given a particular drug. FIG. 14 shows an illustrative embodiment of a data output showing which particular peaks were found by the system to exist in the expected compound data lists. In this manner the invention may more rapidly detect the compounds of interest.

Figure 15:
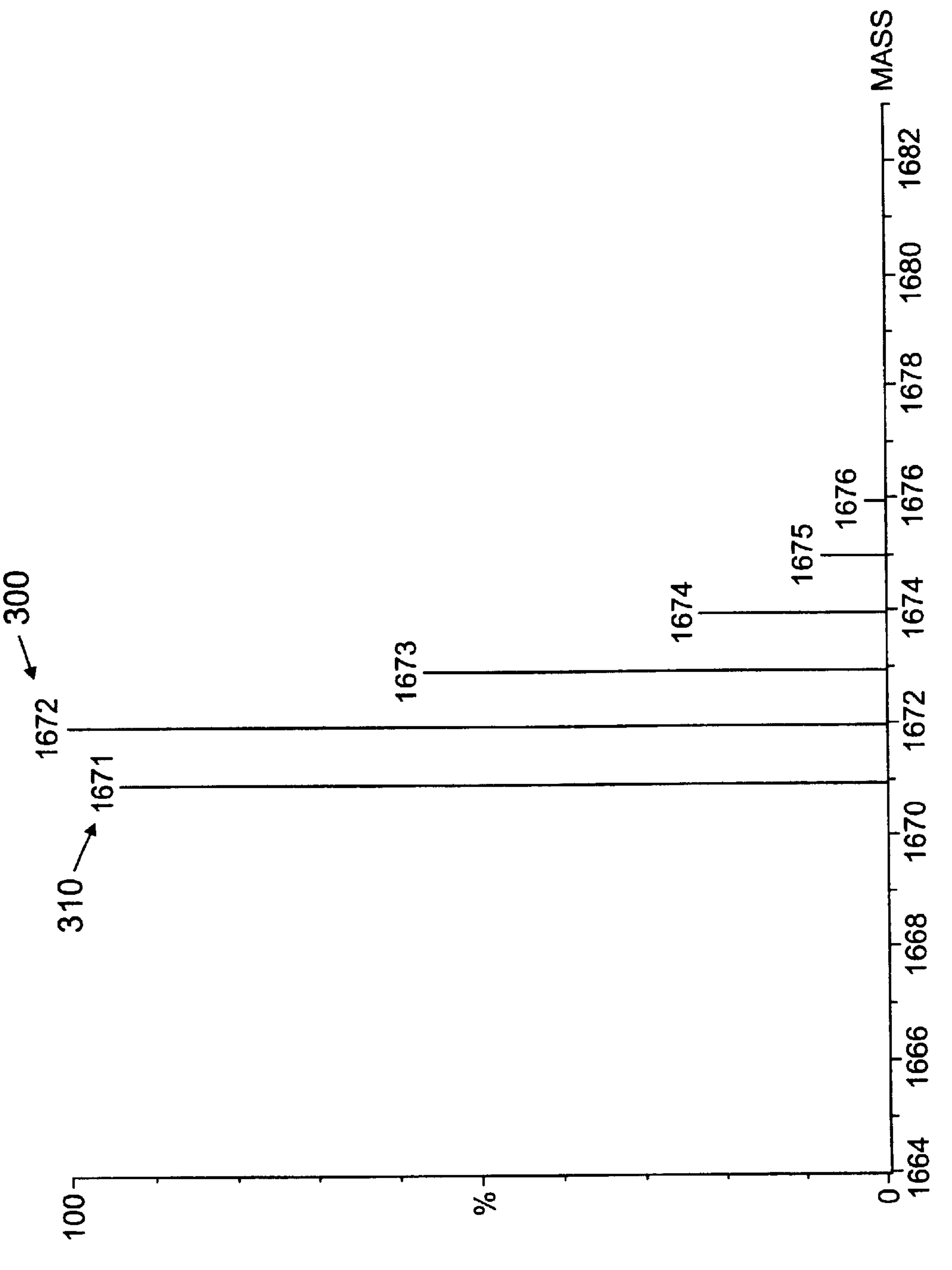
FIG. 15 a pattern for large carbon containing molecules.

There are certain situations which may cause the system to fail to properly identify compounds. FIG. 15 shows the MS for an organic molecule having more than 80 carbon atoms. As discussed previously the system determines whether or not a peak that is at an expected m/z value is a true peak or an isotope by looking at the peak that is at the m/z value given by 1 divided by the charge state as determined in step 160 of FIG. 9. As previously discussed, compounds with more than 80 carbons may have more than half of the molecules with one C-12 replaced by C-13, and thus the peak height of peak 300 is larger than the all C-12 peak 310. Therefore the system will subtract the peak 310 value from peak 300, resulting in a negative value, and flag the peak incorrectly as a mere isotope.

Figure 16:
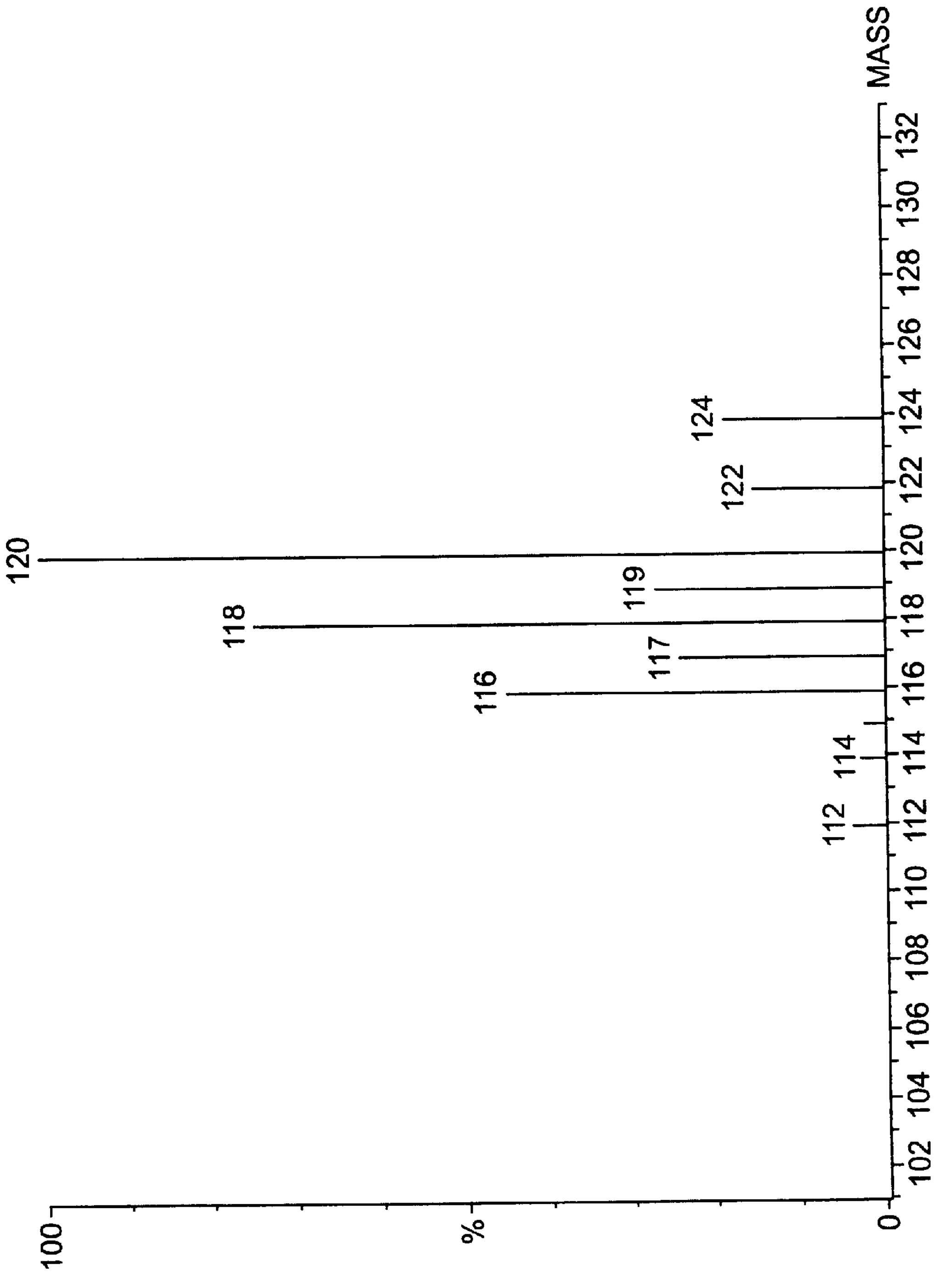
FIG. 16 shows the spectrum for Tin.

Another possible problem is presented in FIG. 16 showing the isotope pattern for Tin. The isotope of Tin that is most abundant is not the lightest value. This case will also cause problems in the system for the same reasons given above with reference to FIG. 15, namely that the most abundant isotope is not the lowest in weight. Tin is occasionally found in organic molecules because of its use as a catalyst. However the distinctive spectral characteristics of Tin allow for a simple screen that searches for an increasing ion count with the peaks separated by two m/z units, and thus the potential problem may be turned into a benefit for expected Tin containing compounds.

Figure 17A:
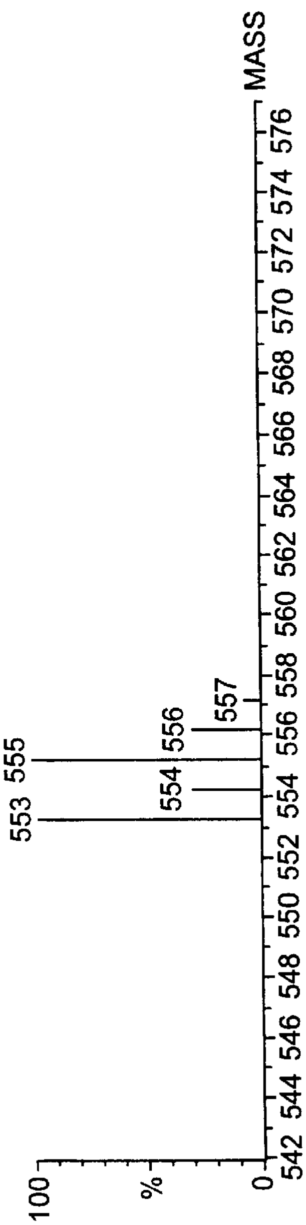
FIGS. 17*a–c* show isotope patterns for molecules containing bromine atoms.
Figure 17B:
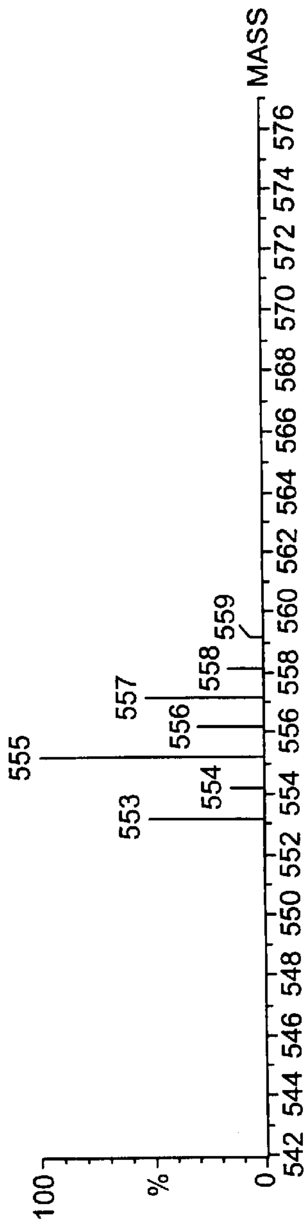
Figure 17C:

FIG. 17 shows another area of concern for the use of the invention. The element Bromine is occasionally found in organic molecules and also has an atypical isotope distribution. FIG. 17A shows a typical organic molecule having one bromine atom. The peak at 553 has the bromine atom Br-79. The peak at 555 has one Br-81 atoms substituted into the molecule. The problem is that even the two peaks are roughly the same height, and further are separated by two m/z units. Thus the system can not determine which is an isotope peak. The situation is worse for molecules with two or three bromine atoms as shown by FIGS. 17B and C. When such characteristic isotope patterns as those caused by bromine and chlorine are expected, the system is adaptable to searching for the characteristic double peak spaced two units apart for proper identification of the molecule.

In summary the present invention has the unique features of being generally applicable to the analysis of mass chromatographic data obtained by using any MS methodology such as Gas Chromatographs or Liquid Chromatographs, for gases or liquids, inorganic or organic. The system may be implemented using any common programming language and on any common computing device. The number of molecules that my be searched simultaneously is effectively unlimited, and the results are obtained up to 1000 times faster than with current systems. The system can measure ion charge state automatically, and automatically compensate for different ionization adduces such as sodium. The system can differentiate many molecular species from isotopes and can search for distinct spectral patterns such as caused by bromine or chlorine.

Although the invention has been described with regard to a preferred embodiment, one of skill in the art will appreciate that other embodiments are possible. Therefore, it is felt that the invention should not be limited to those embodiments disclosed by the claims, but rather the spirit and scope of the entire disclosure should be included in the scope of the invention.

What is claimed is:

1. A method for analyzing mass spectrometer (MS) data comprising:

performing an MS operation on a first sample to produce a first plurality of output values associated with charge-to-mass (m/z) ratio values;

performing an MS operation on a material to be analyzed to produce a second plurality of output values associated with m/z ratio values;

selecting a first expected m/z ratio and subtracting the value of the second plurality at the first expected output m/z ratio from the value of the first plurality at the first expected m/z ratio to produce a difference value at the first expected m/z ratio;

determining if the difference value exceeds a predetermined value; and repeating the selecting, detecting, and determining for at least one more expected m/z ratio.

2. The method of claim 1, wherein the determining includes generating and storing a positive output signal if the difference value at an expected m/z ratio exceeds the predetermined value for each of a plural number of MS operations.

3. The method of claim 2, wherein the number of MS operations equals 4.

4. The method of claim 1, wherein the determining includes generating and storing a positive output signal only if the value of the second plurality at the first expected m/z ratio also has a peak width that approximates an expected peak width from a library of expected chemical compounds.

5. The method of claim 1, further comprising:

selecting a first one of the m/z ratios;

subtracting the value of the first one of the m/z ratios from the value of the next higher m/z ratio stored in a memory location to produce a mass delta value;

using the mass delta value to derive a charge value;

storing in memory a charge warning signal for the selected first m/z ratio if the charge value is less than a preselected value; and repeating the selecting, subtracting, using, and storing with at least one other m/z ratio stored in the memory location.

6. The method of claim 5, wherein the charge value is the reciprocal of the mass delta value, and wherein the preselected value of the charge value is one half.

7. The method of claim 1, further comprising:

selecting a first one of the m/z ratios and an associated one of the second plurality of output values;

subtracting one mass unit from the selected first one of the m/z ratios, producing an interim m/z ratio and selecting the associated value of the second plurality of output values corresponding to the interim m/z ratio;

subtracting the value of the second plurality of output values associated with the interim m/z ratio from the value of the second plurality of output values associated with the first m/z ratio, producing an intensity delta value;

storing an isotope warning signal in a first m/z ratio memory location if the intensity delta value is less than a preselected value; and repeating the selecting, subtracting, and storing for at least one other m/z ratio.

8. The method of claim 7, wherein further the preselected value of the intensity delta value is greater than zero.

9. The method of claim 1, further comprising:

storing each of the first plurality of output values and associated m/z ratio values in a first plurality of memory locations;

storing each of the second plurality of output values and associated m/z ratio values in a second plurality of memory locations;

selecting a first expected output m/z ratio having an associated chemical compound;

subtracting a specified one of the first plurality of output values of the control sample from a specified one of the second plurality of output values of the material to be analyzed, the specified one of each of the pluralities of output values being selected to be from the first expected output m/z ratio value, the subtracting producing a difference value at the m/z ratio;

indicating the first expected output m/z ratio and the associated second plurality of output values as a function of the difference value and storing a flag signal in a third plurality of memory locations;

repeating the selecting, subtracting, and generating with each individual one of the remaining expected m/z ratios; and outputting a list of all output m/z ratios stored in the third plurality of memory locations.

10. The method of claim 1, wherein the repeating is performed for a number of m/z ratios in a library of chemical compounds.

11. The method of claim 1, wherein the repeating is performed for a series of stepped m/z ratios.

12. A mass spectrographic (MS) analysis method comprising:

generating an MS signal for a control sample and storing first values at each m/z ratio as a function of time;

generating an MS signal for a material to be analyzed and storing second values at each m/z ratio as a function of time;

comparing a difference between the first signals and second signals to a threshold and saving as third values the differences above the threshold;

comparing the third values with a list of m/z values to identify matches, thereby determining if a compound from the list is present in the material to be analyzed.

13. The method of claim 12, wherein the list is a library of compounds.

14. The method of claim. 12, wherein the list is a series of stepped values.

15. The method of claim 12, wherein a single control value is used for all compounds of the first and second values.

16. The method of claim 12, wherein the control value is altered dynamically such that a set of the second values becomes the control first values.

17. The method of claim 12, further comprising identifying doubly charged and/or triply charged ions.

18. The method of claim 17, wherein the identifying includes comparing an m/z ratio to another sample and taking a difference and inverting.

19. A method comprising:

generating a first liquid chromatography mass spectroscopy (LC/MS) signal of a protein;

after the generating, providing a protein in a bath of a relatively large number of ligands;

washing the ligands so that a relatively small number of ligands is bonded to the protein;

generating a second LC/MS signal of the protein after the washing;

comparing the first and second LC/MS signals to determine mass to charge (m/z) points wherein the second signal exceeds the first signal; and comparing times of arrival for specific ligands the comparing processes for determining possible ligands bonded to the protein.

* * * * *